United States Patent
Song et al.

(10) Patent No.: US 12,074,959 B2
(45) Date of Patent: Aug. 27, 2024

(54) DNP3.0-DDS GATEWAY AND DATA TRANSFER METHOD USING SAME

(71) Applicant: INDUSTRY-UNIVERSITY COOPERATION FOUNDATION OF SEOKYEONG UNIVERSITY, Seoul (KR)

(72) Inventors: Byung-Kwen Song, Seoul (KR); Yongseong Kim, Gyeongju-si (KR); Youjung Choi, Seoul (KR)

(73) Assignee: INDUSTRY-UNIVERSITY COOPERATION FOUNDATION OF SEOKYEONG UNIVERSITY, Seoul (KR)

( * ) Notice: Subject to any disclaimer, the term of this patent is extended or adjusted under 35 U.S.C. 154(b) by 0 days.

(21) Appl. No.: 18/469,322

(22) Filed: Sep. 18, 2023

(65) Prior Publication Data

US 2024/0223677 A1    Jul. 4, 2024

(30) Foreign Application Priority Data

Jan. 4, 2023  (KR) .......................... 10-2023-0001420

(51) Int. Cl.
H04L 12/24    (2006.01)
H04L 41/042   (2022.01)
H04L 69/08    (2022.01)

(52) U.S. Cl.
CPC .................... *H04L 69/08* (2013.01)

(58) Field of Classification Search
CPC ....... H04L 69/08; H04L 12/24; H04L 41/042; H04L 63/0245

(Continued)

(56) References Cited

U.S. PATENT DOCUMENTS

| | | | |
|---|---|---|---|
| 2012/0268550 A1* | 10/2012 | Park | H04N 7/188 348/14.02 |
| 2013/0132555 A1* | 5/2013 | Wang | H04L 41/042 709/223 |
| 2017/0331787 A1* | 11/2017 | Mikami | H04L 63/0245 |

FOREIGN PATENT DOCUMENTS

| | | | |
|---|---|---|---|
| KR | 10-1743904 B1 | 6/2017 | |
| WO | WO-2016010230 A1 * | 1/2016 | H04L 12/66 |
| WO | WO-2017175925 A1 * | 10/2017 | H04L 12/66 |

OTHER PUBLICATIONS

DNP3 Adapter for RTI Connext DDS Routing Service—User's Manual, https://github.com/rticommunity, Real-Time Innovations, Inc' section 3, DNP3 Simulator, https://github.com/rticommunity/rticonnextdds-dnp3/blob/master/rs_adapter/USERS_MANUAL.md#DNP3_Simulator (Year: 2014).*

* cited by examiner

*Primary Examiner* — Jude Jean Gilles
(74) *Attorney, Agent, or Firm* — Stein IP, LLC

(57) ABSTRACT

Proposed are a DNP3.0-DDS gateway and a data transfer method using the same. The DNP3.0-DDS gateway includes a DNP3.0 master including a first mapping module which extracts DNP3.0 object data, generates the extracted object data as an IPC PDU and transfers the IPC PDU, and a DDS publisher including a second mapping module which receives the IPC PDU from the DNP3.0 master and maps an extracted IPC PDU value to a DDS data type. According to the DNP3.0-DDS gateway and the data transfer method using the same, by converting a system of a P3.0 server/client format into a DDS publish-subscribe format in real time, it is possible to prevent the overload phenomenon of a server when a plurality of clients request data information, and thus, real-time data processing is made possible with high reliability.

8 Claims, 9 Drawing Sheets

(58) Field of Classification Search
USPC .......................................................... 709/208
See application file for complete search history.

DNP3.0-DDS GATEWAY AND DATA TRANSFER METHOD USING SAME

CROSS REFERENCE TO RELATED APPLICATION

The present application claims priority to Korean Patent Application No. 10-2023-0001420, filed on Jan. 4, 2023, the entire contents of which are incorporated herein for all purposes by this reference.

BACKGROUND

1. Technical Field

The present disclosure relates to a DNP3.0-DDS gateway and a data transfer method using the same and, more particularly, to a DNP3.0-DDS gateway and a data transfer method using the same, in which the DNP3.0 is equipped with a first mapping module for extracting object data and transferring the object data as an IPC PDU and a DDS publisher is equipped with a second mapping module for receiving the IPC PDU and mapping the object data to DDS data.

2. Related Art

DNP3.0 is a proven remote control standard used by energy suppliers of many countries around the world including the United States, and is mainly used for substation and control system automation in the power utility industry. DNP3.0 communicates in a master/slave format, and sends an unsolicited response as a voluntary message to a master when an incident occurs. DNP3.0 supports multiple-master, multiple-slave and peer-to-peer communications. DNP3.0 focuses on providing lightweight means of transferring simple data values while maintaining a high level of integrity.

A SCADA system using the DNP3.0 protocol generally has a platform-dependent problem so that interoperability or scalability is not high, and also has a problem that it is difficult to manage and transfer large amounts of data in real time between large-scale SCADA systems.

PRIOR ART DOCUMENT

[Patent Document]
Korean Patent No. 10-1743904 (Registered on May 31, 2017)

SUMMARY

The present disclosure is intended to solve the above problems, and an objective of the present disclosure is to provide a DNP3.0-DDS gateway and a data transfer method using the same, having high interoperability and scalability without being dependent on a platform between DNP3.0-based large-scale SCADA systems and being capable of managing and transferring large amounts of data in real time between the large-scale SCADA systems.

In an embodiment, a DNP3.0-DDS gateway suitable for converting DNP3.0 object data into DDS data may include: a DNP3.0 master including a first mapping module which extracts DNP3.0 object data, generates the extracted object data as an IPC PDU and transfers the IPC PDU; and a DDS publisher including a second mapping module which receives the IPC PDU from the DNP3.0 master and maps an extracted IPC PDU value to a DDS data type.

In an embodiment, a method for transferring DNP3.0 object data as DDS data through conversion may include: a first step of receiving DNP3.0 object data from a DNP3.0 slave by a DNP3.0 master; a second step of extracting the DNP3.0 object data, generating the extracted object data as an IPC PDU and transferring the IPC PDU by the DNP3.0 master; and a third step of receiving the IPC PDU from the DNP3.0 master, extracting an IPC PDU value, and mapping the extracted IPC PDU value to a DDS data type.

According to the DNP3.0-DDS gateway and the data transfer method using the same according to the present disclosure, by converting a system of a P3.0 server/client format into a DDS publish-subscribe format in real time, it is possible to prevent the overload phenomenon of a server when a plurality of clients request data information, and thus, real-time data processing is made possible with high reliability.

DETAILED DESCRIPTION

Figure 1:
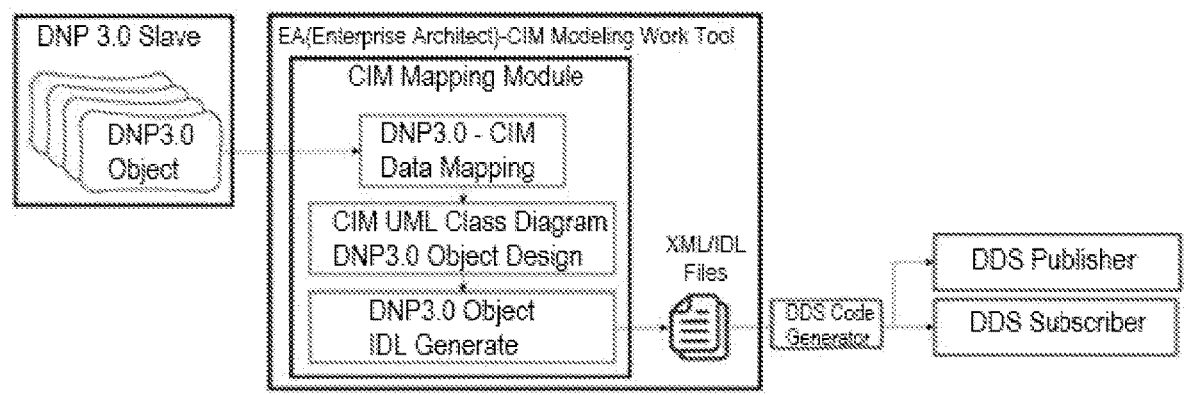
FIG. 1 is a CIM-based DNP3.0-DDS cross mapping architecture in accordance with an embodiment of the present disclosure.

The terms used in the present disclosure are only used to describe specific embodiments, and are not intended to limit the present disclosure. A singular expression includes a plural expression unless the context clearly dictates otherwise. In the present specification, it should be understood that terms such as "include" or "have" are intended to designate that a feature, a number, a step, an operation, a component, a part, or a combination thereof described in the specification is present, but do not preclude the possibility of presence or addition of one or more other features, numbers, steps, operations, components, parts, or combinations thereof.

In addition, in the present specification, the word "on" or "over" means positioning on or below an object portion, but does not necessarily mean positioning on the upper side of the object portion based on a gravitational direction. Additionally, when a part of a region, plate, etc. is described to be "on" or "above" another part, this not only means that the part is in contact with or at a distance "directly on" or "above" another part, but also means that there is still another part between them.

Further, throughout the specification, if it is described that one component is "connected to" or "accesses" another component, it is to be understood that the one component may be directly connected to or may directly access the other component, but, unless explicitly described to the contrary, the one component may be connected to or access the other component by the medium of still another component.

Further, in the present specification, terms such as "first" and "second" may be used to describe various components, but those components should not be limited by the terms. The terms are only used for the purpose of distinguishing one component from another component.

DDS is data-centric real-time data distribution middleware set as an international standard by OMG, and provides 22 levels of basic network control QoS. Data-centric communication makes it possible to transfer and process vast amounts of data. The DDS provides an automatic discovery function, and provides various communication methods such as one-to-one, one-to-many, many-to-one and many-to-many. Information is exchanged by creating a topic representing the subject of specific data and registering the topic as a topic of interest to a publisher and a subscriber. Topics are transferred through the UDP-based RTPS (real-time publish-subscribe) protocol.

CIM (Common Information Model), a common information model of IEC TC57, was created by CCAPI, and is an abstract model that represents all major objects of power utility businesses typically included in an EMS (Energy Management System) information model. In addition, the CIM includes public classes, properties for objects and relationships between models. The CIM may be expressed in the form of a UML diagram, an object-oriented modeling technique in the IEC standard. By providing a standardized way to represent power system resources in terms of object classes and properties and the relationships between them, the CIM facilitates the integration of EMS applications created independently by various vendors, integration across independently developed EMS systems or integration between EMS systems and systems related to other aspects of power system operation such as generation or power distribution management. Due to the size of the overall CIM, the object classes included in the CIM have been grouped into several logical packages, and each logical package represents a specific portion of the overall power system modeled. This collection of packages consists of several standards.

FIG. 1 shows a CIM-based DNP3.0-DDS cross mapping architecture in accordance with an embodiment of the present disclosure. This is an architecture that creates a CIM-based DDS Pub/Sub. CIM-based DNP3.0 slave object modeling was performed using EA (Enterprise Architect) as a Sparx's CIM modeling tool and the IEC61970 standard provided by TC57. The classes of the package provided by IEC61970 were used, modeling was done by distinguishing between data measured in a power system and controlled data and by identifying the data type of the data configured in a slave.

CIM-based IDL is generated from a modeled product through EA Tool's XML/IDL Generate. To generate DDS IDL, it is necessary to download a CORBA library provided by EA and apply the library to modeled classes. In order to generate the respective classes as one IDL, path settings were made the same.

A generated IDL file is modified to fit the RTI DDS IDL file type. DDS Pub/Sub is generated using RTI's Codegenerator in the modified IDL file.

Figure 2:
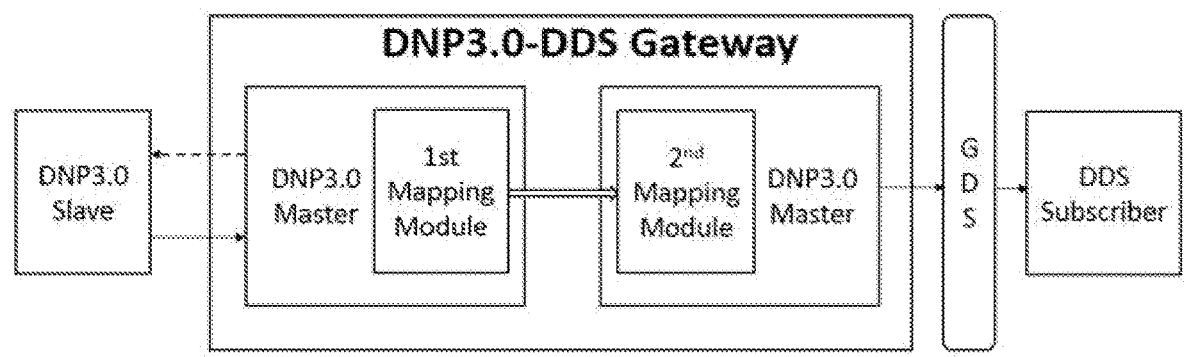
FIG. 2 is a configuration diagram of a data conversion system including a DNP3.0-DDS gateway in accordance with an embodiment of the present disclosure.
Figure 3:
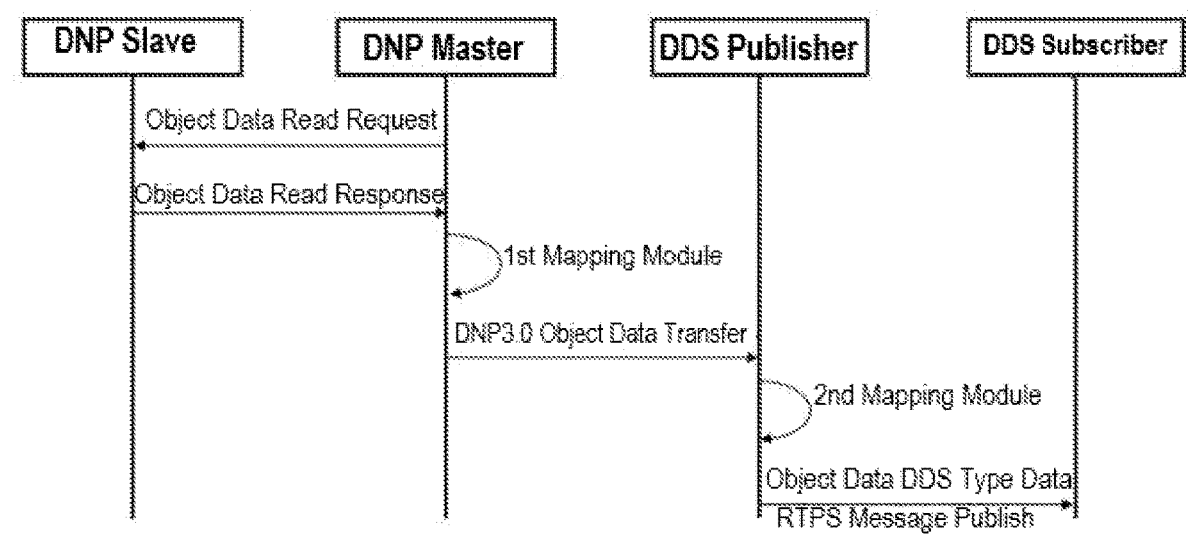
FIG. 3 is a flowchart showing a process in which DNP3.0 application object data of the DNP3.0 protocol is transferred to the DDS protocol through TCP socket communication using the data conversion system of FIG. 2.

FIG. 2 is a configuration diagram of a data conversion system including a DNP3.0-DDS gateway in accordance with an embodiment of the present disclosure, and FIG. 3 is a flowchart showing a process in which DNP3.0 application object data of the DNP3.0 protocol is transferred to the DDS protocol through TCP socket communication using the data conversion system of FIG. 2. When a DNP master transmits an object data read request to a DNP slave, the DNP slave responds to the DNP master with an object data read response, that is, a current object data value and headers. The DNP master extracts DNP object data through a first mapping module, creates an IPC PDU, and transfers data to a DDS publisher. A second mapping module provided to the DDS publisher extracts a DNP object data value from the received IPC PDU, converts the value to fit a DDS data type, and publishes DNP object data as an RTPS message. A DDS subscriber who subscribes to a topic receives the DNP object data.

Figure 4:
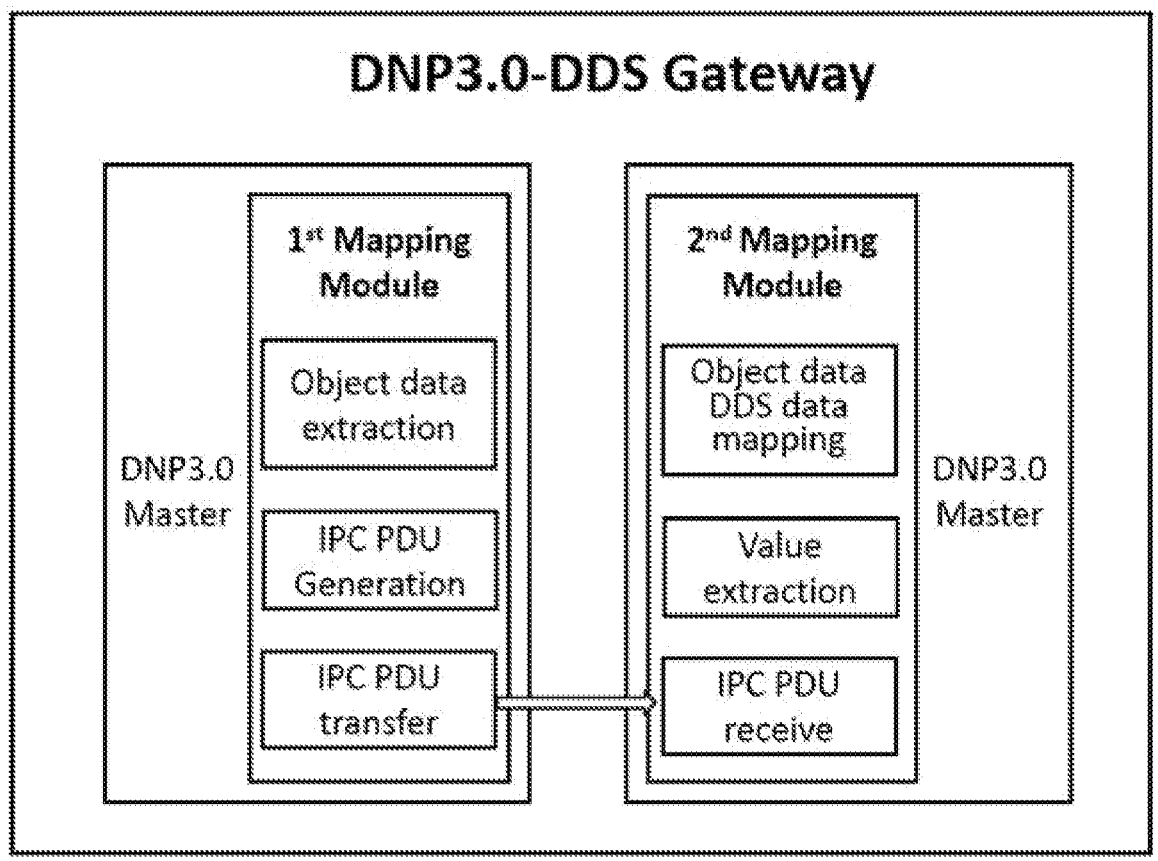
FIG. 4 is a configuration diagram of the DNP3.0-DDS gateway in accordance with the embodiment of the present disclosure.

FIG. 4 is a configuration diagram of the DNP3.0-DDS gateway in accordance with the embodiment of the present disclosure.

Figure 5:
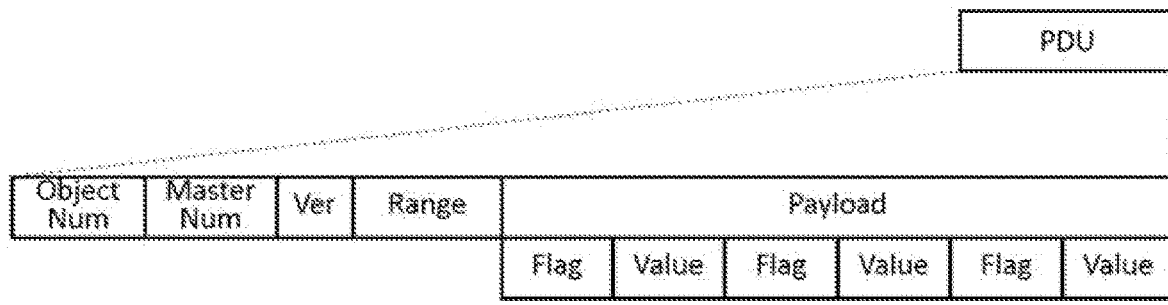
FIG. 5 is an IPC PDU design architecture in accordance with an embodiment of the present disclosure.

During TCP socket communication, the IPC PDU is designed to extract only information that needs to be transferred to the DDS, not the entire application object data received from the DNP3.0 slave by the DNP3.0 master. FIG. 5 is an IPC PDU design architecture in accordance with an embodiment of the present disclosure, and Table 1 is a description of respective parts of the designed IPC PDU. The IPC PDU consists of a header and a payload. The header consists of a DNP3.0 slave object number requested by the DNP3.0 master, numbers to identify respective masters when communication is made with a plurality of masters, a DDS software version, and a range as an index range (a payload length). The payload copies only an application object actual data value received by the DNP3.0 master among the data received as a response.

The first byte of the range represents an index start number, and the second byte represents an index last number. If the number of application object data received exceeds the size of 1 byte, first and second bytes represent an index start number, and third and fourth bytes represent an index last number. The length of the payload may be calculated using the index range.

TABLE 1

| Element | Description |
| --- | --- |
| Object Num | DNP3.0 Slave Object Number (Analog Input, etc . . .) |
| Master Num | DNP3.0 Master Number |
| Ver (Version) | DDS Related Corporation (RTI, OpenDDS, etc . . .) |
| Rage | Index Range (Payload Length Calculate) |
| Flag | Quality (Online, Restart, etc . . .) |
| Value | DNP3.0 Slave Object Value |

A DNP3.0 interface first mapping module was implemented in the DNP3.0 master. The first mapping module is a TCP server which transfers application object data. Threads were used to communicate with multiple clients.

Figure 6:
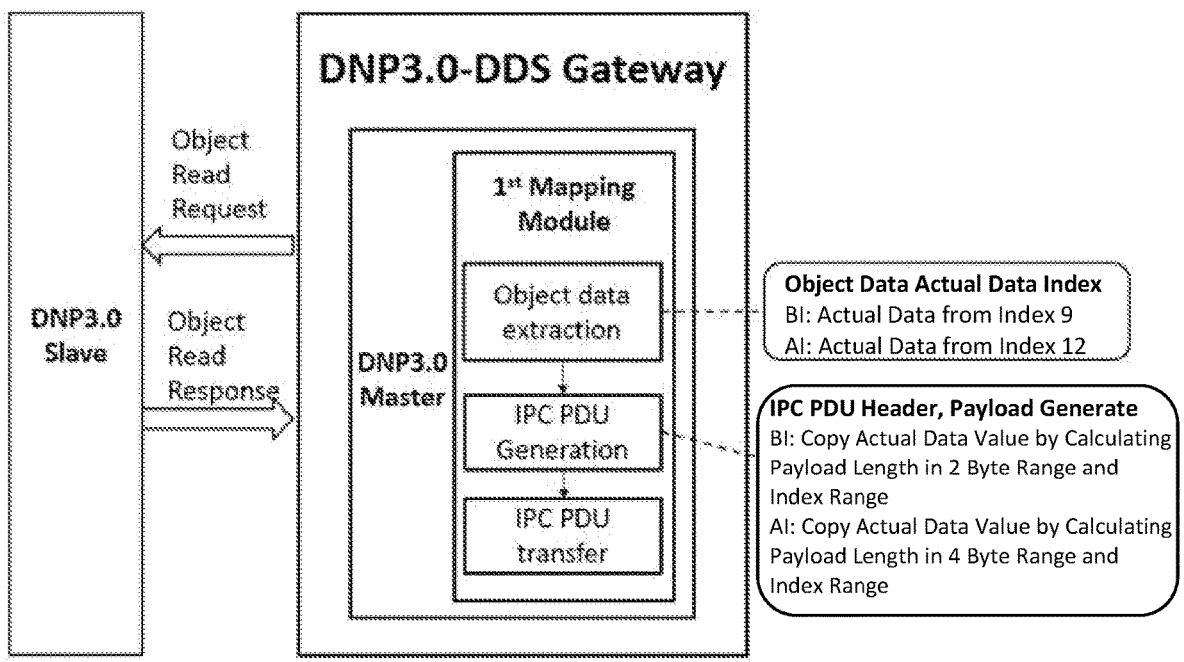
FIG. 6 is the architecture of a DNP3.0 interface first mapping module in accordance with an embodiment of the present disclosure.

FIG. 6 shows the architecture of a DNP3.0 interface first mapping module in accordance with an embodiment of the present disclosure. The DNP3.0 master makes a BI/AI object read request to the DNP slave, and the DNP3.0 slave responds to the read request. Data received in response from the slave is divided into a header and actual data. In order to generate an IPC PDU to be transferred to the DDS, it is necessary to determine what index an actual data value starts from. In the case of a BI (binary input) object, since actual data is inputted per 1 bit, the index range rarely exceeds 1 byte. Thus, an actual data value starts from index 9 of the data received in response from the slave, and in the case of an AI (analog input) object, when the index range exceeds 1 byte, an actual data value starts from index 12 of the data received in response from the slave. Since the index of an actual data value has been found, the IPC PDU is generated. Data is appropriately entered to the IPC PDU header, and an actual data value is copied to the IPC PDU payload by calculating a payload length using the index range. For example, in the case of a BI object, when data is received from number 0 to number 8, the number 0 and the number 8 are designated as respective indexes. Then, since a total data length is '8−0+1=9', a payload length may be calculated as receiving a total of 9 data.

Figure 7:
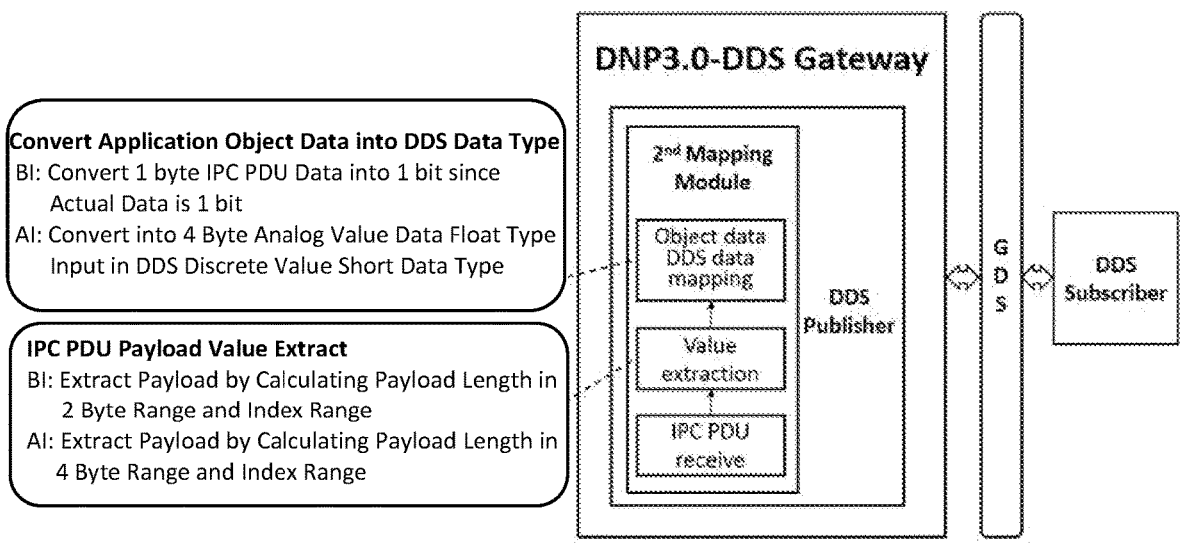
FIG. 7 is the architecture of a DDS Interface second mapping module in accordance with an embodiment of the present disclosure.

A DDS interface second mapping module was implemented in the DDS publisher. The DDS publisher is a TCP client which receives the IPC PDU. The IP and port of the DNP3.0 master's TCP server are entered to make a TCP connection. FIG. 7 shows the architecture of a DDS Interface second mapping module in accordance with an embodiment of the present disclosure. The DDS publisher receives the IPC PDU from the DNP3.0 master. Since the BI/AI application objects may be identified and a payload length may be calculated by using the header of the IPC PDU, the payload value of the IPC PDU is extracted. The extracted IPC PDU value is mapped to fit the DDS data type. In the case of a BI, the application object actual data of the DNP3.0 slave is entered to the value variable of an integer type of a DiscreteValue class, and in the case of an AI, actual data is entered to the value variable of a real number type of an AnalogValue class. The actual data value of the BI application object is stored in the IPC PDU payload by 1 bit each. 1 bit data, which is obtained by dividing 1 byte by 8, is type-converted into an Int (integer) type. The type-converted data is entered to the value variable of the DiscreteValue. The AI application object is stored in the IPC PDU payload as a 1 byte flag and a 4 byte value. The 1 byte flag is not used, and the 4 byte value is stored in one variable in a float type. The stored variable is entered to the value variable of the AnalogValue class.

Figure 8:
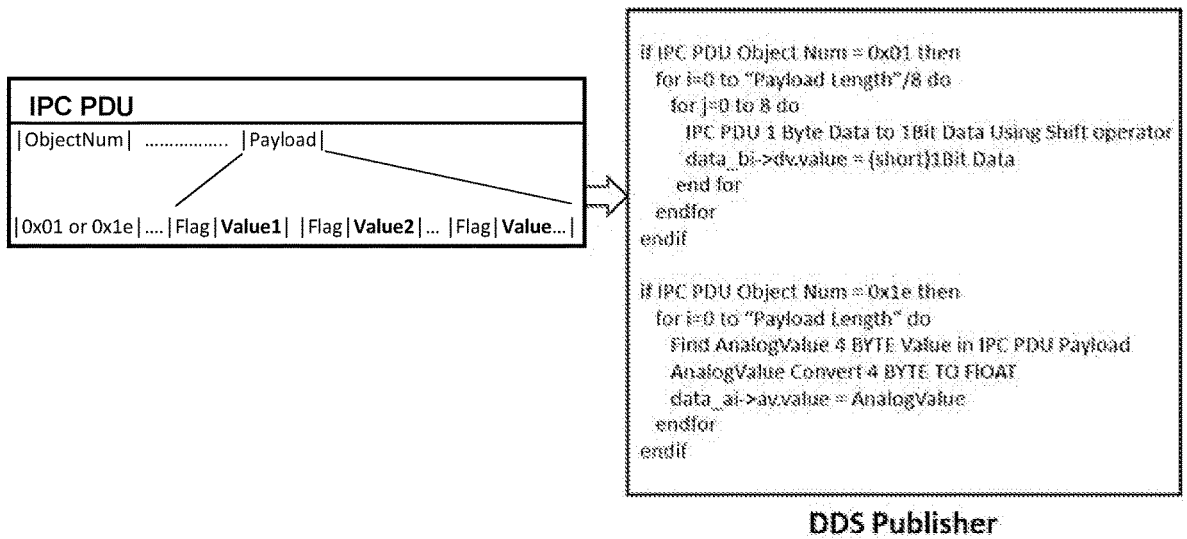
FIG. 8 is an example of a pseudocode that maps the value data of an IPC PDU payload in conformity with a DDS data type in accordance with an embodiment of the present disclosure.

FIG. 8 is an example of a pseudocode that maps the value data of an IPC PDU payload in conformity with a DDS data type in accordance with an embodiment of the present disclosure.

Figure 9:
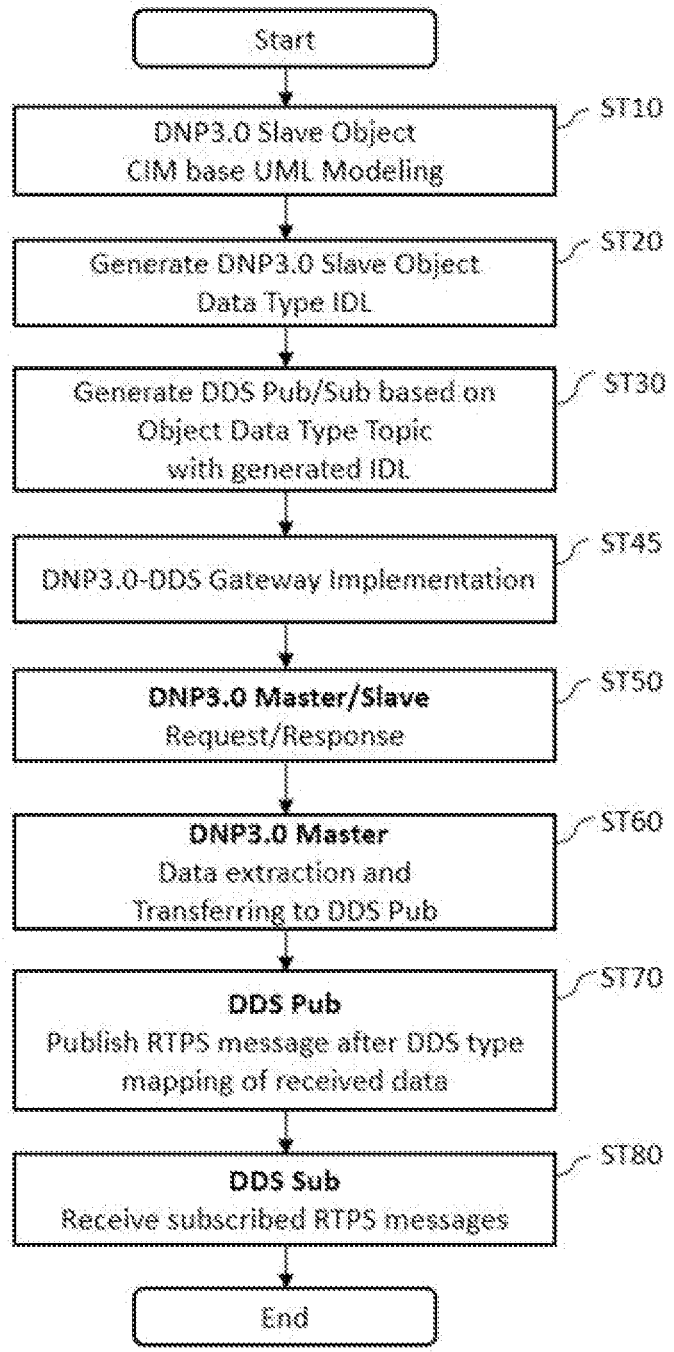
FIG. 9 is an overall flowchart explaining a DNP3.0-DDS protocol conversion flow in accordance with an embodiment of the present disclosure.

FIG. 9 is an overall flowchart explaining a DNP3.0-DDS protocol conversion flow. In FIG. 9, steps ST10 to ST40 are steps for building a DNP3.0-DDS gateway, and the remaining steps are steps for explaining a process in which DNP3.0 object data is converted into DDS data using the built DNP3.0-DDS gateway and a DDS subscriber subscribes.

CIM-based DNP3.0 slave object modeling was performed using EA (Enterprise Architect) as a Sparx's CIM modeling tool and the IEC61970 standard provided by TC57 (ST10). CIM-based UML modeling is generated as CIM-based IDL through EA Tool's XML/IDL Generate (ST20). After the generated IDL file is modified to fit the RTI DDS IDL file type, DDS Pub/Sub are generated using RTI's Codegenerator in the modified IDL file (ST30). A DNP3.0-DDS gateway is formed by implementing the first mapping module in the DNP3.0 master and implementing the second mapping module in the DDS publisher (ST45).

When the DNP master transmits an object data read request to the DNP slave, the DNP slave responds to the DNP master with an object data read response, that is, a current object data value and headers (ST50). The DNP master extracts DNP object data through the first mapping module, creates the IPC PDU, and transfers data to the DDS publisher (ST60). The second mapping module provided to the DDS publisher extracts a DNP object data value from the received IPC PDU, converts the value to fit the DDS data type, and publishes DNP object data as an RTPS message (ST70). The DDS subscriber who subscribes to a topic receives the DNP object data (ST80).

Although preferred embodiments of the present disclosure have been described and illustrated above using specific terms, such terms are only for clearly describing the present disclosure, and it is obvious that various alterations and changes may be made to the embodiments and described terms of the present disclosure without departing from the technical spirit and scope of the following claims.

These modified embodiments should not be understood individually from the spirit and scope of the present disclosure, but should be regarded as falling within the scope of the claims of the present disclosure.

What is claimed is:

1. A DNP3.0-DDS gateway suitable for converting DNP3.0 object data into DDS data, comprising:
   a DNP3.0 master including a first mapping module which extracts DNP3.0 object data, generates the extracted object data as an IPC PDU and transfers the IPC PDU; and
   a DDS publisher including a second mapping module which receives the IPC PDU from the DNP3.0 master and maps an extracted IPC PDU value to a DDS data type.

2. The DNP3.0-DDS gateway of claim 1, wherein the IPC PDU is configured by a header and a payload, and the extracted object data is stored in the payload.

3. The DNP3.0-DDS gateway of claim 2, wherein the header includes a DNP3.0 slave object number requested by the DNP3.0 master, a master identification number and length information of the payload.

4. The DNP3.0-DDS gateway of claim 1, wherein, when mapping the extracted IPC PDU value to fit the DDS data type, the second mapping module enters, when the IPC PDU value is a BI (binary input), application object actual data of a DNP3.0 slave to a value variable of an integer type of a DiscreteValue class, and enters, when the IPC PDU value is an AI (analog input), actual data to a value variable of a real number type of an AnalogValue class.

5. A method for transferring DNP3.0 object data as DDS data through conversion, comprising:
   a first step of receiving DNP3.0 object data from a DNP3.0 slave by a DNP3.0 master;
   a second step of extracting the DNP3.0 object data, generating the extracted object data as an IPC PDU and transferring the IPC PDU by the DNP3.0 master; and
   a third step of receiving the IPC PDU from the DNP3.0 master, extracting an IPC PDU value, and mapping the extracted IPC PDU value to a DDS data type.

6. The method of claim 5, wherein the IPC PDU is configured by a header and a payload, and the extracted object data is stored in the payload.

7. The method of claim 6, wherein the header includes a DNP3.0 slave object number requested by the DNP3.0 master, a master identification number and length information of the payload.

8. The method of claim 5, wherein in the third step, when mapping the extracted IPC PDU value to the DDS data type, the second mapping module enters, when the IPC PDU value is a BI (binary input), application object actual data of a DNP3.0 slave to a value variable of an integer type of a DiscreteValue class, and enters, when the IPC PDU value is an AI (analog input), actual data to a value variable of a real number type of an AnalogValue class.

* * * * *